James M. Carpenter's improved Machine for Cutting Screws.

No. 113740

PATENTED APR 18 1871.

Witnesses.
Jno. C. Hibbard
N. C. Lombard

Inventor.
James M. Carpenter

United States Patent Office.

JAMES M. CARPENTER, OF PAWTUCKET, RHODE ISLAND.

Letters Patent No. 113,740, dated April 18, 1871.

IMPROVEMENT IN MACHINES FOR CUTTING SCREWS.

The Schedule referred to in these Letters Patent and making part of the same.

I, JAMES M. CARPENTER, of Pawtucket, in the county of Providence and State of Rhode Island, have invented certain Improvements in Machinery for Cutting Screws, of which the following is a specification.

This invention relates to certain improvements in machines for cutting screws with dies or cutters, by means of which the operation is much facilitated, and by which, also, screws may be cut of a tapering or varying diameter.

In the machine herein represented the dies or cutters employed are constructed substantially in accordance with those described in Letters Patent granted to me March 9, 1869, and I have shown my improvements as applied in connection with such dies; but some of them may also be applied to other forms of sectional dies or cutters not having that mode of construction.

My invention relates, in the first place, to the mode of constructing and arranging the dies and the devices co-operating therewith so that the dies may be moved radially to enlarge or diminish the diameter of the screw while it is being cut, or to entirely withdraw the dies from the screw so that it may be removed from the dies without turning it backward, without deranging the clearance given to the dies by rocking them upon the axis or bolt by which they are attached to the die-stock.

In my aforesaid patent each die is represented as being mounted upon a bolt or axis upon which it is rocked, to give the proper clearance to the cutting-edge and the exact size of the screw to be made; and it is also, if desired, intended to be further oscillated a sufficient distance to permit the screw to be removed after it is cut.

The last operation would have to be repeated for each screw cut, and as the parts are covered with the chips produced by cutting the screws the dies would be liable to error in coming back to the correct position, and would also soon wear loose upon their axes, both of which evils would change the size of the same.

The purpose of this improvement is to remedy these evils so that the dies may be opened and closed without rocking them upon their axes and still preserve that property of adjusting the size and clearance; and It consists in the combination of each of the dies or cutters with a slide or die-holder which moves radially in the die-stock, and to which the die is attached by an axis upon which the die may be rocked, and also secured to the slide by adjustable fastenings, as will be described; and It also consists in the combination of the die-stock and the slides which carry the dies, arranged radially therein, and an annular cam-plate for simultaneously moving the slides in or out, and a former or pattern which together control the movement of the dies as they pass over the screw, and thus withdraw or advance the dies, and thereby enlarge or contract the diameter of the screw, according to the shape of the former, within the capacity of the dies to cut a form varying from the cylindrical; and It also consists in combining with the annular cam-plate or its equivalent for moving the dies and the former or its equivalent, an adjusting-screw or other equivalent means of adjusting the relation of the former to the dies, so that thereby a succession of cuts may be taken by the dies by repeating the operation.

My invention also relates to the mechanism by which the pitch of the screw to be formed is accurately determined, and the dies are relieved of the labor of dragging the die-stock and its adjuncts forward and longitudinally as the dies form the thread, and consists in combining with the die-stock, or with the mandrel that turns the screw instead, a leading-screw arranged concentric with the axis of the mandrel and dies, and having a pitch coinciding with that of the screw to be formed or some multiple thereof, so that the force required to draw the die-stock along, or the mandrel that holds the screw, as the case may be, shall not be exerted by the thread that is being formed; but shall be exerted by the leader in a line with the axis, and so as to hold the die-stock in equilibrium.

My invention also relates to the employment of means for protecting the dies from the wearing produced by the scale of the iron when screws are cut whose surfaces are in the condition in which they are left by the forging, and consists in combining with one or more of the dies a scaling-tool which works in advance of the dies and removes the scale from the surface of the screw-blank, and can be readily removed and replaced to sharpen the same without disturbing the dies.

Description.

In the drawing—

The mechanism herein shown and described is designed to be used in connection with the head-stock and bed of a common lathe, the mandrel of which is provided with means for holding and turning the screw to be cut, and is especially adapted to cutting taps both tapering and straight, or with a short portion only of the point tapered, in which cases, as well as in others where the screw is to be cut upon a surface that is already turned, the scaling-tools shown are to be omitted.

A is the frame of the machine, which is somewhat similar in form to the tail-stock of a lathe, and is fitted in the same manner to the ways of the lathe-bed.

B is a mandrel fitted to the standards A', as shown, which slides back and forth like the back center of a lathe, the mechanism for moving which is not shown.

The inner end of the mandrel B extends a considerable distance from the standard, and upon this part carries the die-stock C and its accessory parts, which slide lengthwise upon it.

At the extreme end it carries a back-center, $C^1$, so that the screw to be cut can be suspended upon centers if desired, as in a common lathe.

The part of the mandrel B that is between the standards A', carries a sleeve, $B^2$, which is formed with a screw upon its surface of the same pitch as the screw to be cut, or some multiple thereof, which serves as a leader to carry the die-stock along, as will be described.

The sleeve $B^2$ is revolved coincidently with the main arbor of the head-stock by means of the gear $B^1$, which is connected therewith by a shaft and a train of gearing, not shown.

The die-stock C has a long hub or sleeve, which is nicely fitted to the mandrel B, and is of a sufficient length to allow the longitudinal movement of the die-stock upon the mandrel required to cut the screw.

The outer part of the die-stock is of a disk-like form, in the outer part of which radial recesses or grooves are formed in which the slides or die-holders D work, to which the several segmental dies E are attached by the bolts F, as shown. These dies are substantially such as are described in my aforesaid patent of March 9, 1869.

Figure 3:
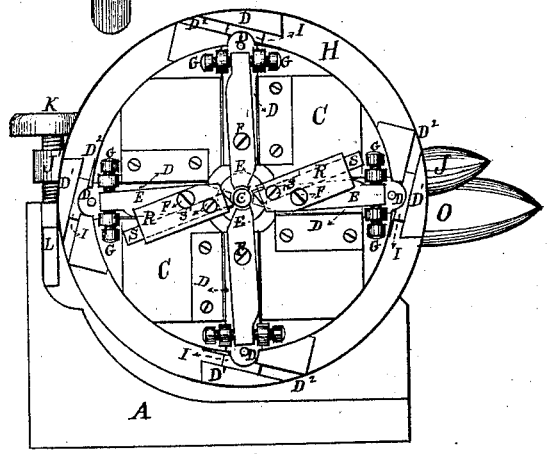
Figure 3 is an end elevation showing the face of the die-stock and its connections.

The dies E are slightly rocked to give the proper clearance to their cutting-edges, by the adjusting-screws G working through lugs upon the holders D, as is shown in fig. 3.

Upon the outside of the die-stock C is fitted the cam-plate H, which embraces both the periphery and the hub of the die-stock, and oscillates upon it.

At those points in the circumference which correspond with the holders D, it is provided with cams or inclines $D^1$, and grooves $D^2$, in which the slide-blocks I work, each of which is connected by a rule-joint with the outer end of one of the holders D, as is shown.

By this construction the dies are moved in or out, and held in position by the cam-plate with great accuracy and firmness.

To the hub of the cam-plate a handle, J, is attached to oscillate it by the hand of the operator when it is required to open the dies, and the lever J' is also attached to the hub upon the opposite side, in the outer end of which is the adjusting-screw K', the point of which rests upon the pattern or former L, which determines the taper to be given to the screw that is being cut.

The pattern L is of the proper form to give the cam-plate H such a rotary movement as will impart the necessary radial movement to the dies, and is attached to a bracket on the frame A, as shown, so that it can be readily changed when desired.

To the back end of the die-stock C a cross-head, $C^2$, is attached, to the arms of which two parallel rods M M are fitted, which work through guides in the standard A', as is shown.

The other ends of the rods M are also fitted into the cross-head N, which is provided with a long sleeve, N', which slides upon the leading-screw $B^2$. This arrangement allows the die-stock C and its attachments to slide lengthwise on the mandrel B and steadies it, and at the same time prevents the die-stock from turning with the screw.

O is a lever which hangs upon one of the rods M as a fulcrum, and is provided with a segment of a nut, which, when the lever is raised engages with the leading-screw $B^2$ and carries the die-stock and its connections forward.

Figure 2:
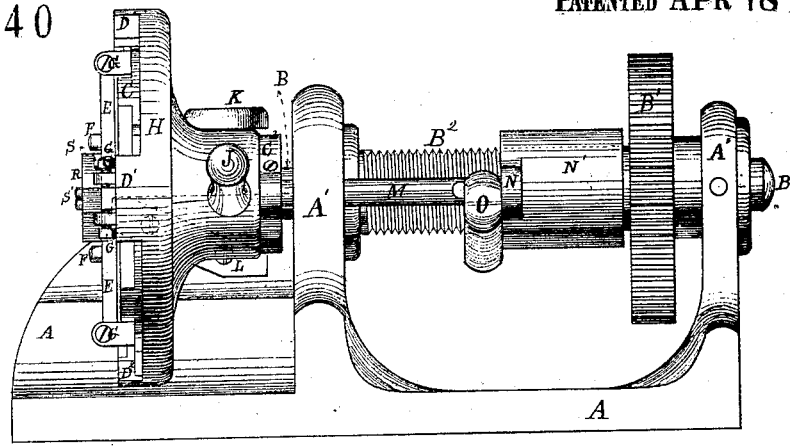
Figure 2 is a side elevation.
Figure 1:
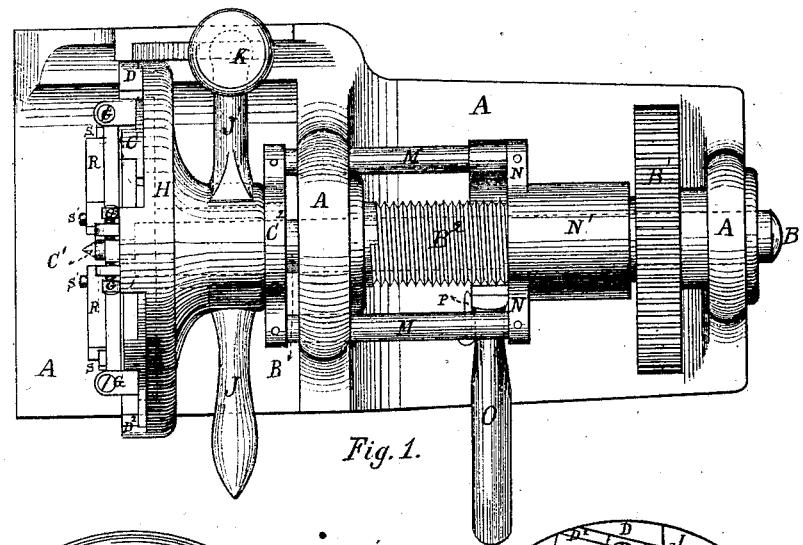
Figure 1 is a plan of the machine.
Figure 4:
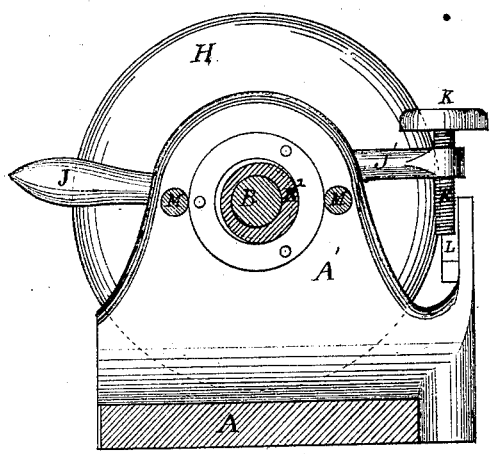
Figure 4 is a transverse sectional elevation looking toward the back of the die-stock.

The lever O is held at the opposite side of the leading-screw between the cross-head N and a lug, P, upon one of the guide-rods, as is shown in fig. 1.

R R are the stocks or holders for the scaling-tools, which are attached to two opposite dies or their holders, each of which carries a scaling-tool, S, which is inserted in a socket and held therein by a set-screw, S'. The scaling-tools are set so as to remove the surface of the screw-blank, and can be removed, sharpened, and replaced without disturbing the dies, in an obvious manner.

The operation of the machine in cutting a tap, for instance, is as follows:

The tap is placed upon the centers so as to be turned by the main arbor, as in a lathe, and the cam-plate is turned by the operator by the handle J, until the end of the screw K rests upon the former L. The lever O is then raised, which brings the segment of the nut that it carries into engagement with the leading-screw $B^2$, which carries the die-stock and dies forward over the screw-blank.

As the die-stock and its connections move forward, the operator holds the lower end of the screw K firmly upon the former L, so that the screw slides along its upper surface. The former in this case is inclined to the axis of the lathe so as to cut a tapering screw, thereby turning the cam-plate backward as the die-stock moves forward, which, by means of the connections described, draws the dies back and gradually enlarges the diameter of the screw to the desired extent.

If a tapering point only is required, with the tap made cylindrical, the former is made with the first part only inclined, with the remainder of the surface made straight and set parallel with the axis of the lathe.

When the dies have passed over the screw the cam-plate is turned back by the handle J, which opens the dies, and the lever O is lowered, which disengages the die-stock from the leader. The die-stock is then slid back to the position to remove the screw and receive another screw-blank.

In cutting ordinary screws, it will generally be found sufficient to run the dies once over the blank to form the thread; but if greater nicety is required, as for instance in cutting taps, a second or third cut may be taken by turning the adjusting-screw K backward a little at each cut, which allows the cam-plate to turn a little further forward and carry the dies further toward the center, in an obvious manner.

The details of this mechanism may be considerably modified without departing from the mode of operation of the mechanism herein described, and I have already devised several other forms of construction; but that herein shown I have used with perfect success, and I have therefore represented it as a complete embodiment of my invention.

Instead of using the oscillating cam-plate to move the dies, and a former to move the cam-plate, separate similar cams may be applied directly to each die, which work in a direction parallel to the axis, and are each made of such form as to give the same movement to the dies that the former gives through the cam-plate, as herein shown. I first proposed to use this form, but I deem the one shown the best, as being more durable and more convenient in changing the form of the screw to be made.

Other similar modifications may obviously be made by which the dies can be moved radially under the control of the former, in cutting the screw, which is the fundamental principle of my invention.

The use of scaling-tools, also, is not limited to dies constructed and operating as is herein described, but they may be used with the same beneficial result in connection with any of the various forms of dies in common use.

What I claim is—

1. The combination of the die-stock, the dies, two or more, capable of moving radially therein, as described, and the rotating cam-plate and cams or their equivalent, for moving the dies simultaneously, and the former or pattern for imparting said movement as the dies pass lengthwise over the screw to form the threads, substantially as described.

2. The combination of the die-stock, the radially-moving slides, the pivoted dies or cutters and mechanism, substantially as described, for adjusting said cutters.

3. The combination of a die-stock, two or more multi-threaded dies arranged radially in said stock, and a leading-screw and movable nut to connect therewith, the threads of said screw and nut corresponding in pitch to the pitch of the die-threads, substantially as described.

4. The adjusting-screw K or its equivalent, in combination with the former and the devices that move the dies or cutters radially, substantially as described.

5. In combination with the die-stock and multi-threaded dies, the scaling-tool, substantially as described.

Executed January 20, A. D. 1871.

JAMES M. CARPENTER.

Witnesses:
 WM. O. HIBBARD,
 N. O. LOMBARD.